United States Patent [19]

Khan

[11] 4,426,501
[45] Jan. 17, 1984

[54] EMULSION COPOLYMERIZATION PROCESS USING COMONOMER SOLUBILITY AFFECTING ADDITIVES

[75] Inventor: Ausat A. Khan, Newark, Del.

[73] Assignee: E. I. Du Pont de Nemours and Company, Wilmington, Del.

[21] Appl. No.: 458,660

[22] Filed: Jan. 17, 1983

[51] Int. Cl.$^3$ .................... C08F 2/22; C08F 210/02; C08F 214/18

[52] U.S. Cl. .................... 526/206; 526/209; 526/210; 526/250; 526/348; 526/331; 526/255; 526/273; 526/249; 526/329; 524/767; 524/768

[58] Field of Search .................... 524/206, 768, 767; 526/348, 250, 206, 209, 210

[56] References Cited

U.S. PATENT DOCUMENTS

| | | | |
|---|---|---|---|
| 3,624,250 | 11/1971 | Carlson | 260/80.75 |
| 3,752,784 | 8/1973 | Jenkins | 524/768 |
| 3,801,552 | 4/1974 | Kometani et al. | 260/80.77 |
| 4,113,687 | 9/1978 | Ugelstad | 260/29.6 |
| 4,381,384 | 4/1983 | Khon | 526/206 |

FOREIGN PATENT DOCUMENTS 50-30932 3/1975 Japan .................... 524/768
958465 5/1964 United Kingdom .

OTHER PUBLICATIONS

Emulsion Polymerization, I. Pirima, Editor, Academic Press, New York, 1982, Chapter 11, pp. 383-413.
W. I. Miguchi et al., Physical Degradation of Emulsions via the Molecular Diffusion Route ..., J. Pharm. Sci. 51, 459-466, (1962).
M. K. Stryker et al., Kinetics and Mechanism of the Emulsion Polymerization of Ethylene, J. Polymer Sci. Part C, 27, 35-48, (1969).
J. Ugelstad et al., Absorption of Low Molecular Weight Compounds in Aqueous Dispersions ..., Maknurd Chem. 180, 737-744, (1979).

*Primary Examiner*—Joseph L. Schofer
*Assistant Examiner*—Peter F. Kulkosky

[57] ABSTRACT

Copolymerization in aqueous emulsion of ethylene with one or two comonomers having different water solubilities is more efficient when at least two but no more than three comonomer solubility-affecting additives are present in the copolymerization medium, at least one of which increases the solubility in water of one of the comonomers, while at least another one decreases the solubility in water of another comonomer. In this manner, the diffusion rates of comonomers to the copolymerization locus are well controlled; the rate of polymerization often is increased; the concentrations of the comonomers at the copolymerization locus remain constant; and the copolymer composition remains constant. This process improvement can be applied to the copolymerization of many comonomer combinations of great commercial interest, including, for example ethylene/tetrafluoroethylene and ethylene/ethyl acrylate copolymerizations.

12 Claims, 2 Drawing Figures

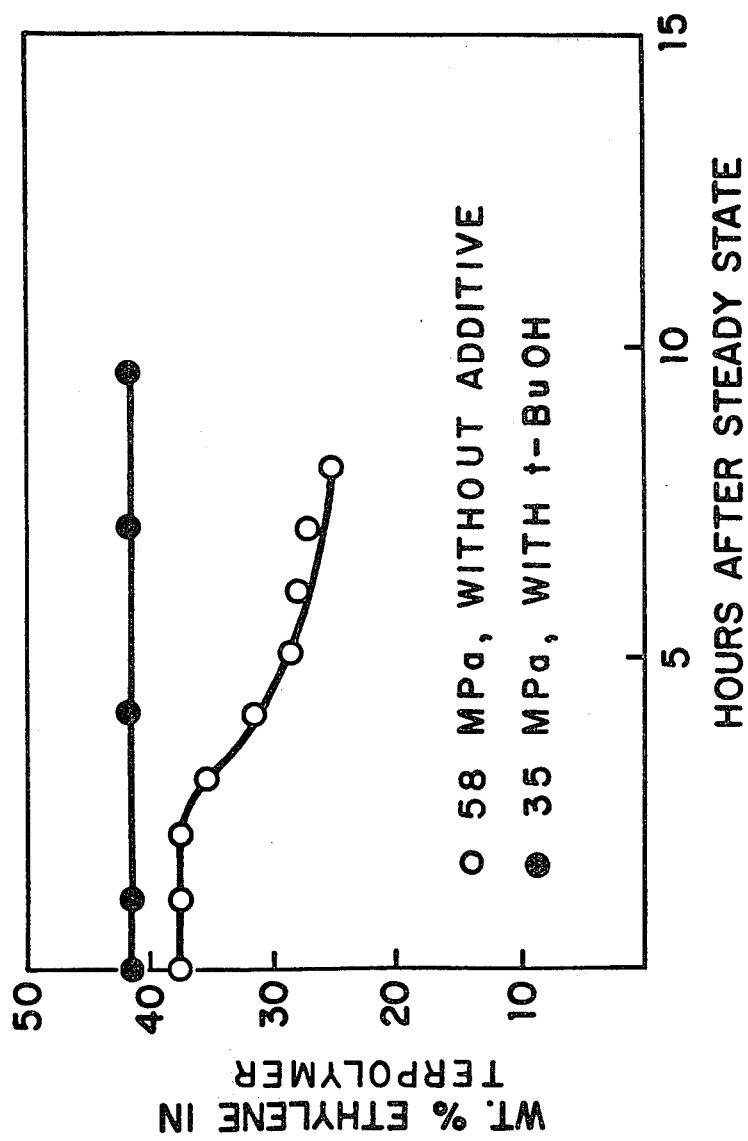

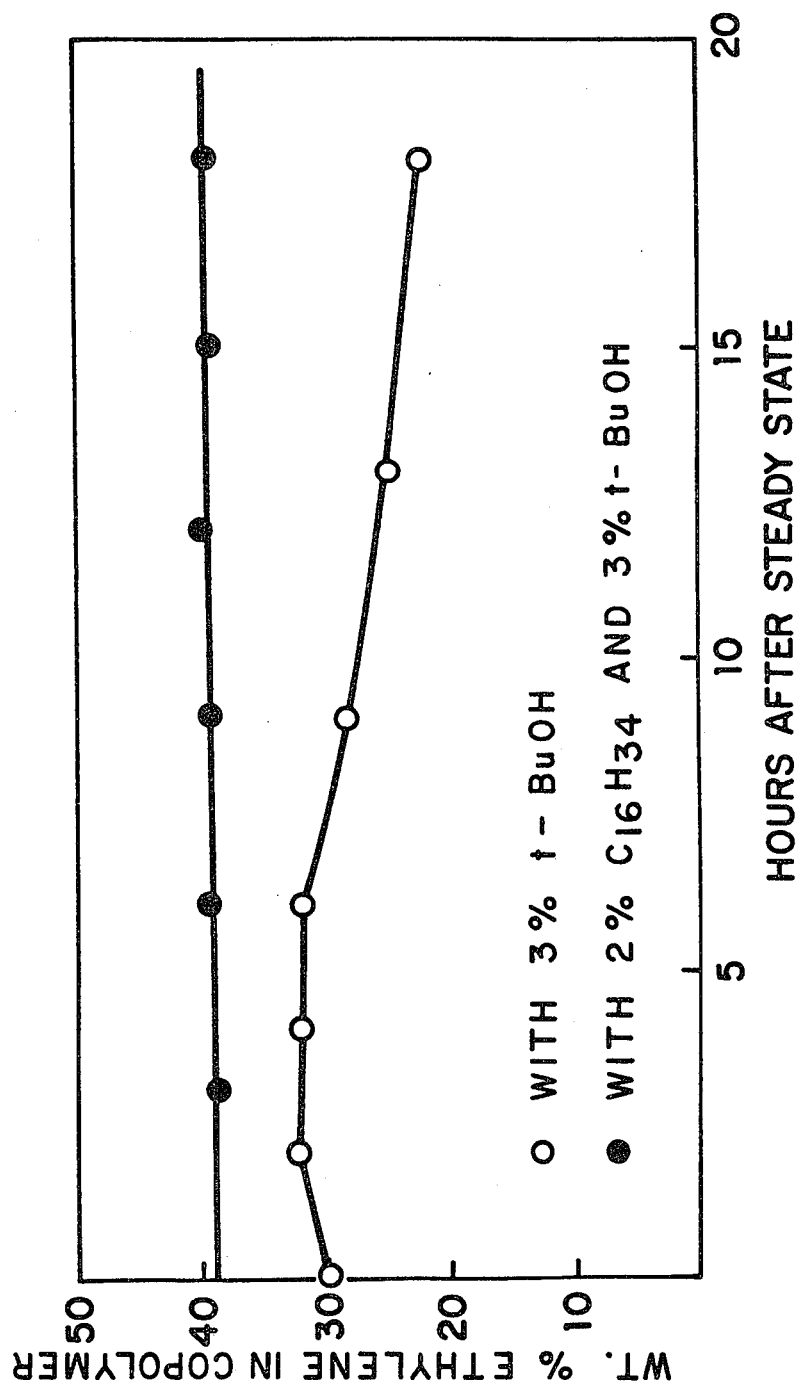

EMULSION COPOLYMERIZATION PROCESS USING COMONOMER SOLUBILITY AFFECTING ADDITIVES

BACKGROUND OF THE INVENTION

This invention is directed to an improvement in emulsion copolymerization of two comonomers at least one of which is a gas, and which have different solubilities in water.

Higuchi et al, showed in an article in *J. Pharm. Sci.* (1962) 51,459 that a slightly water-soluble organic compound well dispersed in an aqueous emulsion will gradually diffuse into the aqueous phase, and the emulsion will thus become destabilized unless a small amount of another material insoluble in water but completely miscible with the organic compound is added to stabilize the emulsion.

U.S. Pat. No. 4,113,687 (to Ugelstad) describes a process for preparing stable emulsions of vinyl monomers having a limited water solubility, wherein in the first step a material having a very low solubility in water (such as hexadecane) is emulsified by an efficient homogenization, and then water and the desired vinyl monomer are added. The monomer diffuses rapidly into the preformed droplets and is polymerized to large particles.

In the aqueous emulsion copolymerization of ethylene and vinyl acetate in a stirred reactor, where the monomers, catalyst, surfactant, and water are fed continuously, and the partially converted polymer latex is removed continuously, the copolymer composition changes as a function of time because of the variation of ethylene concentration in the polymer particles. Stryker et al. reported in *J. Polymer Sci.*, Part C; 27, 35–48 (1969) that when a small amount of t-butyl alcohol is added to the aqueous phase in ethylene homopolymerization, the concentration of ethylene in the homopolymer particles remains constant. This is explained by an increase of the rate of transport of gaseous ethylene to the locus of polymer formation to a level where the concentration of emulsified ethylene at the locus of polymerization is constant throughout even an extended residence time.

When two monomers are copolymerized in an aqueous emulsion, at least one of which is a gas, and each has a different solubility in water, the more water-soluble monomer will diffuse more rapidly to the polymer particles and will thus be present at a higher concentration at the polymerization locus. The resulting copolymer will usually contain a higher proportion of the more water-soluble monomer than could be predicted from the respective monomer feed rates and polymerization rates. It thus would be desirable to carry out emulsion copolymerization of two or more comonomers having different water solubilities under conditions which would permit good control of monomer concentrations at the locus of polymerization and thus would result in copolymers having a broader range of comonomer ratios.

SUMMARY OF THE INVENTION

According to the present invention, there is now provided an improved process for copolymerizing in an aqueous emulsion at least two but no more than three comonomers having different solubilities in water, the monomer combinations being selected from the following classes:

(1) ethylene with at least one of ethyl acrylate, methyl acrylate, vinyl acetate, methyl methacrylate, and glycidyl methacrylate; and (2) one of ethylene, propylene, and isobutylene with one of tetrafluoroethylene and chlorotrifluoroethylene and with about 0–2 mole % of a copolymerizable vinyl monomer which is free of telogenic activity, and which incorporates into the copolymer a side chain containing at least two carbon atoms, with the side chain having only single bonds between elements, except that the side chains may consist essentially of aromatic rings;

wherein at least two but no more than three comonomer solubility-affecting additives are present in the copolymerization medium, at least one of which increases the solubility in water of one of the comonomers, while at least another one decreases the solubility in water of another comonomer;

with the proviso that in the case of copolymerization of three comonomers, one of the comonomers may serve as the solubility-affecting additive for another comonomer.

BRIEF DESCRIPTION OF DRAWINGS

FIGS. 1 and 2 are plots of polymerization time vs. ethylene content of copolymers of ethylene with vinyl acetate and glycidyl methacrylate and with methyl acrylate, respectively.

DETAILED DISCUSSION OF THE INVENTION

In the most commonplace situation, there will be two comonomers and two additives, one of the additives being hydrophilic and the other one being hydrophobic. One of the comonomers, usually the more water-soluble comonomer, often will be liquid at room temperature, while the less water-soluble comonomer will be a gas.

The hydrophilic additive preferably should be sufficiently soluble in water at the polymerization temperature to form water solutions containing at least about 15% by weight of the additive, and desirably it should be able to dissolve the less water-soluble comonomer at the operating pressure to give a comonomer-in-additive solution containing at least about 20% by weight of that comonomer. It preferably should not be an effective chain transfer agent, but this is not a critical requirement and to a large extent depends on the desired molecular weight of copolymer.

The hydrophobic additive must be completely miscible with the more water-soluble comonomer in all proportions. Its solubility in water at the polymerization temperature preferably should be within the range of about $10^{-2}$ to $10^{-6}$ weight percent. The molecular weight of this hydrophobic additive normally will be within the range of about 170–500, although this is not a critical requirement. The hydrophobic additive competes effectively for the water-soluble comonomer with the copolymer particles already present in the polymerization, and this reduces that comonomer's concentration in the copolymer particles relative to the other comonomer.

For the purpose of the present disclosure terms such as "more water-soluble" and "less water-soluble" and are relative and may not correspond to solubility labels applied by chemists to various organic compounds. Thus, for example, both ethylene and tetrafluoroethylene are normally considered to be insoluble in water; yet, the solubility of tetrafluoroethylene is higher than that of ethylene. In the context of the present disclosure the important criterion is not so much the absolute solubility of a monomer but the respective solubilities of two comonomers, which should be different.

Thus, for example, a copolymer of tetrafluoroethylene with ethylene can be made by a continuous process wherein both comonomers are bubbled at a constant pressure into the polymerization medium, i.e., water containing the catalyst and one or more surfactants, to which are added t-butyl alcohol as the hydrophilic additive and 1,1,2-trichloro-1,2,2-trifluoroethane (sold by E. I. du Pont de Nemours and Company, Wilmington, Del., U.S.A. as Freon ® 113) as the hydrophobic additive. The copolymer particles are stabilized by the surfactant, which in this case preferably is the ammonium salt of a fluorocarbonsulfonic acid (the fluorocarbon portion of the surfactant being adsorbed on the particle surfaces.) The surface of the polymer particles contains a low surface energy group which has some affinity for tetrafluoroethylene but little affinity for ethylene. Therefore, in the absence of additives, the concentration of tetrafluoroethylene on the surface of polymer particles would be much higher than the concentration of ethylene, and the copolymer would contain a higher proportion of tetrafluoroethylene than would be expected from monomer feed rates and polymerization rates. By adding t-butyl alcohol alone one could slightly increase the rate of transport of ethylene to the polymerization locus and thus increase the proportion of ethylene in the copolymer to about 20 mole percent. However, when t-butyl alcohol is used in conjunction with Freon ® 113, the latter additive is solubilized by t-butyl alcohol, and this mixed additive has a better equilibrium distribution than either additive alone among the copolymer particles, water phase, gas bubbles, and droplets. This combination increases the diffusion rate of both comonomers to the polymerization locus and then holds the comonomers on copolymer particles. In this manner, the rate of polymerization is increased; the particle growth occurs; and the copolymer composition remains constant.

The third monomer, which may be present in some copolymerizations according to the process of the present invention should be free of telogenic activity, that is, it should not act as a chain transfer agent to an extent which undesirably limits the molecular weight of the polymer. This definition is used in U.S. Pat. No. 3,624,250 to Carlson, and the disclosure of that patent is herein incorporated by reference. Typical non-telogenic monomers recited in that patent include, among others, fluorinated vinyl monomers having the formulas R—CF=CF$_2$ and R—O—CF=CF$_2$, wherein R is an organic group, which may be acyclic or cyclic and may contain an aromatic ring. The R group contains 2 to 8 carbon atoms. Usually, R will be highly fluorinated. Representative monomers include, for example, perfluorobutene-1 and perfluoroheptene-1, ω-hydroperfluorooctene-1, and vinyl ethers such as XCF$_2$(CF$_2$)$_n$OCF=CF$_2$, where X is F, H, or Cl, and n is an integer of 1 to 7. Such ethers include, for example, perfluoro(ethyl vinyl ether), 3-hydroperfluoro(propyl vinyl ether), and perfluoro(2-methylene-4-methyl-1,3-dioxolane).

Representative hydrophilic additives include t-butyl alcohol, hexafluoroisopropyl alcohol, t-butyl methyl ether, t-amyl alcohol, and t-amyl methyl ether. Typical hydrophobic additives are higher hydrocarbons such as octane, dodecane, and hexadecane or aliphatic process oil (a mixture of C$_{10}$—C$_{30}$ hydrocarbons); long chain alkylbenzenes; esters of long chain aliphatic mono- and dicarboxylic acids, for example octyl stearate or cyclohexyl palmitate; carboxylic acid esters with long chain aliphatic alcohols, for example, hexadecyl propionate or octadecyl acetate; and fluorocarbon liquids such as Freon ® 113, perfluoro(2-butyl-tetrahydrofuran), and ω-hydro(oligomeric hexafluoropropylene oxide) oil.

As stated above, one of the comonomers in a copolymerization of three monomers may serve at the same time as an additive which either increases or decreases the solubility of another comonomer, so that addition of a hydrophilic or hydrophobic additive, as the case may be, is not required. For example, in the copolymerization of ethylene with vinyl acetate and glycidyl methacrylate the glycidyl methacrylate also acts as the hydrophobic agent for vinyl acetate. It thus is only necessary to carry out this copolymerization in the presence of a hydrophilic additive, which increases the solubility of ethylene in water. It should be clear that a comonomer will be an effective solubility-affecting additive for another monomer only when its own water solubility is sufficiently different from the water solubility of the other comonomer.

The amount of each additive normally will be less than about 5% of the weight of water, which is the dispersing medium. An amount of less than about 1% often is adequate. As little as 0.1% by weight of each additive may in many cases be sufficient, although it is preferred to have at least about 0.25% of each. The amounts of both additives do not have to be the same.

Polymerization initiators are water-soluble free-radical generators known to the art such as, for example, ammonium or alkali metal persulfates, inorganic and organic peroxides such as hydrogen peroxide and t-butyl hydroperoxide, and inorganic or organic redox systems such as ammonium persulfate/sodium sulfite and hydrogen peroxide/aminoiminomethanesulfinic acid. The initiator concentration is about 0.5–10% by weight of the more water-soluble comonomer.

If the monomer is a liquid at the polymerization temperature, its concentration in the emulsion is about 5 to 25% based on the weight of water; if it is a gas, its partial pressure should be at least 2 MPa.

The process of this invention is applicable to both batch and continuous processes, but its importance is greater in a continuous process, where steady state conditions are normally more difficult to achieve.

This invention is now illustrated by the following examples of certain representative embodiments thereof, where all parts, proportions, and percentages are by weight unless otherwise indicated.

All the polymerization experiments were carried out in a continuous manner.

In reactions in which tetrafluoroethylene was copolymerized with a hydrocarbon monomer, chloropentafluorethane (available from E. I. du Pont de Nemours and Company as Freon ® 115) was used as a diluent to avoid the danger of explosion under pressure. Chloropentafluoroethane is a gas under the polymerization conditions; it has water solubility properties similar to those of tetrafluoroethylene; and it does not behave in the polymerization reaction as either a hydrophilic or a hydrophobic agent. Approximate water solubilities at room temperature of the monomers and solubility-affecting additives used in the examples are given below. All data are expressed as weight percent in a saturated solution in water at normal pressure.

| | |
|---|---|
| Glycidyl Methacrylate | $<10^{-2}$ |
| Octadecyl Methacrylate | $10^{-6}$ |
| Octane | $10^{-3}$ |
| Dodecane | $10^{-4}$ |
| Hexadecane | $10^{-6}$ |
| Freon ® 113 | $0.4 \times 10^{-3}$ |
| Isobutylene | $1.7 \times 10^{-1}$ |
| Tetrafluoroethylene | 1 |
| Ethylene | $10^{-1}$ |
| Vinyl Acetate | 2.5 |
| Methyl Acrylate | 5.6 |
| Ethyl Acrylate | 1.5 |
| t-Butyl Alcohol | all proportions |

All data are reported using SI units, although certain measurements or readings were obtained in different units.

EXAMPLES 1-5

The polymerization vessel was a 7.57 L, vertical, stainless steel reactor equipped with four inlet ports and one exit port, and a magnetic-drive stirrer. The reactor was steam/water jacketed for temperature control. A master solution of surfactant was prepared which consisted of water, surfactant, one component of the catalyst, trace metal ion, and t-butyl alcohol. The reactor was completely filled with this solution, heated to the desired polymerization temperature (50°-110° C.), and stirred at a constant speed. The catalyst and surfactant streams were introduced at predetermined rates prior to the introduction of the monomers for at least 15 minutes, to 'condition' the reactor.

The gaseous monomers were then metered continuously through rotameters and fed to a diaphragm compressor, which discharged the monomer continuously at the desired pressure and temperature into the reactor. The liquid monomer was pumped into the reactor at the desired pressure and at the predetermined rate.

The reaction temperature was maintained by control of the jacket temperature. The feed rates of the liquid and gaseous monomers, catalyst, and surfactant solutions were maintained constant during the entire operation. The reaction mass, i.e., latex and unchanged monomers were removed continuously from the reactor at the same rate as the fresh materials were pumped into the reactor. The discharge from the reactor was controlled by a back pressure regulator (Annin valve) into a degasser, where the unchanged gaseous monomer separated from the latex and passed through a wet test meter for determining the amount of gaseous monomer conversion.

The latex was coagulated with methanol, washed several times with methanolic water, and dried at 60° C. in a vacuum oven.

Inherent and Mooney viscosities were determined for representative polymers according to the ASTM methods D-2857 and D-1646, respectively. The composition of copolymers was determined by oxygen analysis or by infrared or proton nmr spectroscopy.

The polymerization conditions, copolymer inherent viscosities, and ethylene content in the copolymer are shown in Table 1.

TABLE 1
SUMMARY OF RESULTS

| | | Example No. | | | | |
|---|---|---|---|---|---|---|
| | | 1 | 2 | 3 | 4 | 5 |
| Monomer Feed | | | | | | |
| Vinyl Acetate | mL/hr | 748 | 789 | — | — | — |
| Glycidyl Methacrylate | mL/hr | 41 | 41 | — | — | — |
| Ethylene | g/hr | 513 | 503 | 1080 | 1080 | 720 |
| Methyl Acrylate | mL/hr | — | — | 600 | 480 | 470 |
| Hexadecane | mL/hr | — | — | — | — | 10 |
| Water Solution | | | | | | |
| Water | mL/hr | 1238 | 1175 | 1817 | 1319 | 1319 |
| Alipal ® Co 436* | mL/hr | 79 | 80 | 125 | 102 | 102 |
| Sodium formaldehyde sulfoxylate** | g/hr | 4.0 | 3.5 | 5.3 | 3.8 | 3.8 |
| 2% Ferrous NH$_4$ Sulfate | mL/hr | 0.8 | 0.8 | 1.2 | 0.02 | 0.02 |
| t-Butyl alcohol | mL/hr | — | 63 | 92 | 75 | 75 |
| Catalyst Solution | | | | | | |
| Water | mL/hr | 54.4 | 59.4 | 118.8 | 59.4 | 177 |
| 30% H$_2$O$_2$ | mL/hr | 0.6 | 0.6 | 1.2 | 0.6 | 2.7 |
| Solids, based on latex | percent | 33 | 36 | 26 | 28 | 28 |
| Pressure | MPa | 58 | 35 | 35 | 58 | 58 |
| Temperature | °C. | 50 | 50 | 50 | 50 | 50 |
| Residence Time | min | 240 | 240 | 180 | 240 | 240 |
| Inherent Viscosity, dL/g (30° C. in tetrahydrofuran) | | 2.53 | 6.58 | 0.85 | 1.16 | 1.1 |
| % Ethylene (average) in polymer | | 27 | 42 | 20 | 26 | 40 |

*ammonium alkylphenoxy(polyoxyethylene)sulfate (GAF Corp.)
**Adduct of formaldehyde and sodium bisulfite FIGS. 1 and 2 are plots of elapsed time after reaching steady state vs. copolymer ethylene content for the copolymers of Examples 1 and 2 and 4 and 5, respectively. The lower curve in FIG. 1 was obtained in the absence of a hydrophilic additive, while the upper plot was obtained in the presence of 5% of t-butyl alcohol based on the amount of water. In this case, t-butyl alcohol was the hydrophilic additive for ethylene, while glycidyl methacrylate functioned as the hydrophobic additive for vinyl acetate. The lower curve in FIG. 2 was obtained in the presence of 3% of t-butyl alcohol, while the upper plot was obtained in the presence of 2% of hexadecene and 3% of t-butyl alcohol. Hexadecane was the hydrophobic additive for methyl acrylate, and t-butyl alcohol was the hydrophilic additive for ethylene. In each drawing the upper plot was a straight line indicating constant composition.

EXAMPLES 6-9

A tetrafluoroethylene/ethylene copolymer was prepared in a continuous 3.875 L reactor stirred at a constant speed. The general technique was the same as in Examples 1-5.

The experimental conditions and monomer conversions are given in Table 2.

TABLE 2

| | | Example No. | | | |
|---|---|---|---|---|---|
| | | 6 | 7 | 8 | 9 |
| Monomer Feed | | | | | |
| Tetrafluoroethylene | g/hr | 648 | 648 | 648 | 648 |
| Ethylene | g/hr | 155 | 155 | 155 | 155 |
| Freon ®-115 | g/hr | 450 | 450 | 450 | 450 |
| Catalyst Solution | | | | | |
| Ammonium persulfate | g/hr | 1.5 | 4.5 | 4.0 | 4.0 |
| Na$_2$HPO$_4$.7H$_2$O | g/hr | 1.5 | 1.5 | 2.25 | 2.0 |
| Water | L/hr | 2.0 | 2.0 | 1.0 | 1.0 |
| Surfactant Solution | | | | | |
| F(CF$_2$.CF$_2$)CH$_2$CH$_2$OSO$_3$NH$_4$* | g/hr | | 20 | 10 | 15 |
| F(CF$_2$.CF$_2$)$_4$CH$_2$CH$_2$SO$_3$NH$_4$** | g/hr | 20 | — | — | — |
| Water | L/hr | 2 | 2 | 1 | 0.85 |
| t-Butyl alcohol | L/hr | — | — | — | 0.15 |
| Temperature | °C. | 95 | 95 | 95 | 95 |
| Pressure | MPa | 4.1 | 4.1 | 4.1 | 4.1 |
| % Conversion | | >5 | 5 | 5 | 64 |

*Fluorosulfonate described in U.S. Pat. No. 3,825,577 (to Lalu et al.)
**Fluorosulfate described in allowed U.S. application Ser. No. 293,333, filed August 11, 1981, by the present inventor.

As can be seen, in the absence of t-butyl alcohol (the hydrophilic additive) overall conversions were very low. The copolymer was very rich in tetrafluoroethylene (about 96%). Where t-butyl alcohol (the hydrophilic additive) was present, a high conversion of monomers was observed. The copolymer contained 90.4% of tetrafluoroethylene and 9.6% of ethylene; thus a certain amount of ethylene enrichment was achieved.

EXAMPLES 10-11

Copolymerization of tetrafluoroethylene and ethylene in a 3.875 L reactor stirred at a constant speed was repeated, except that both the hydrophilic additive (t-butyl alcohol) and the hydrophobic additive (Freon ® 113), were present, as shown in Table 3, which also gives the results.

TABLE 3

| | | Example No. | |
|---|---|---|---|
| | | 10 | 11 |
| Monomer Feed | | | |
| Tetrafluoroethylene | g/hr | 650 | 500 |
| Ethylene | g/hr | 170 | 135 |
| Freon ®-115 | g/hr | 300 | 230 |
| Catalyst Solution | | | |
| Ammonium persulfate | g/hr | 4.0 | 4.0 |
| Na$_2$HPO$_4$.7H$_2$O | g/hr | 1.0 | 1.0 |
| Water | L/hr | 1.0 | 1.0 |
| Surfactant Solution | | | |
| F(CF$_2$CF$_2$)$_4$CH$_2$CH$_2$OSO$_3$NH$_4$ | g/hr | 15.0 | 18.0 |
| Water | L/hr | 1.0 | 1.0 |
| Additive Solution Feed | | | |
| Freon ® 113 | L/hr | 0.1 | 0.1 |
| t-Butyl alcohol | L/hr | 0.1 | 0.1 |
| Temperature | °C. | 95 | 95 |
| Pressure | MPa | 4.1 | 4.1 |
| Conversion | % | 64 | 95 |
| Melting Point | °C. | 258 | 258 |
| Composition of Copolymer | | | |
| Mole % Ethylene | | 54.6 | 52.3 |
| Mole % Tetrafluoroethylene | | 45.4 | 47.7 |

High conversions were achieved in both cases, but this time a more balanced comonomer composition was obtained in each run than in Example 9.

EXAMPLES 12-14

Ethylene was copolymerized with ethyl acrylate in a 3.875 L reactor according to the general technique of Examples 1-5. The experimental data and results are given in Table 4.

TABLE 4

| | | Example No. | | |
|---|---|---|---|---|
| | | 12 | 13 | 14 |
| Monomer Feed | | | | |
| Ethylene | g/hr | 600 | 600 | 300 |
| Ethyl acrylate | g/hr | 525 | 500 | 370 |
| Octadecyl Methacrylate | g/hr | 30 | — | — |
| Hexadecane | g/hr | — | 50 | — |
| Heptane | g/hr | — | — | 175 |
| Catalyst Solution | | | | |
| Ammonium persulfate | g/hr | 2.1 | 2.1 | 2.1 |
| Water | l/hr | 0.9 | 0.9 | 0.75 |
| Surfactant Solution | | | | |
| Alipal ® Co 436 | g/hr | 72 | 72 | 65 |
| t-Butyl alcohol | l/hr | 0.09 | 0.09 | 0.06 |
| Water | l/hr | 0.81 | 0.81 | 0.69 |
| Temperature | °C. | 95 | 95 | 70 |
| Pressure | MPa | 34.5 | 34.5 | 34.5 |
| Copolymer ethylene content | % | 26.9 | 24.9 | 25.1 |
| Glass Transition Temp. | °C. | −38 | −39 | −39 |
| Mooney Viscosity (1 + 10 minutes at 100° C.) | | 25 | 9 | — |

In Example 12 octadecyl methacrylate functioned as both a comonomer and a hydrophobic additive. Hexadecane was the hydrophobic additive in Example 13, and heptane was the hydrophobic additive in Example 14. The hydrophilic additive in all these Examples was t-butyl alcohol. Copolymers having fairly similar ethylene content were made in all three runs.

EXAMPLES 15-16

Tetrafluoroethylene was copolymerized with isobutylene according to the technique of Examples 1-5. In Example 15 a 3.875 L reactor was used. The experimental conditions and the results are summarized in Table 5.

TABLE 5

| | | Example No. | |
|---|---|---|---|
| | | 15 | 16 |
| Monomer Feed | | | |
| Tetrafluoroethylene | g/hr | 600 | 600 |
| Isobutylene | g/hr | 40 | 13 |
| Freon ® F-115 | g/hr | 275 | 275 |
| Catalyst Solution | | | |
| Ammonium persulfate | g/hr | 2.5 | 2.5 |
| Na$_2$HPO$_4$.7H$_2$O | g/hr | 1.67 | 1.67 |
| Water | L/hr | 1.0 | 1.0 |
| Surfactant Solution | | | |
| F(CF$_2$CF$_2$)CH$_2$CH$_2$SO$_3$NH$_4$ | g/hr | 22.5 | 22.5 |
| Water | L/hr | 1.5 | 1.5 |
| Additive Feed | | | |
| Freon ®-113 | L/hr | .085 | .085 |
| t-Butyl alcohol | L/hr | .015 | .015 |

TABLE 5-continued

| | | Example No. | |
|---|---|---|---|
| | | 15 | 16 |
| Reactor Temperature | °C. | 105 | 105 |
| Reactor Pressure | MPa | 6.2 | 6.2 |
| Conversion of TFE | % | 90 | 90 |
| Wt. % isobutylene in copolymer | | 8.4 | 3.1 |

In both examples, stable emulsion was obtained and polymerization was very well controlled. It has been established in other experiments that in the absence of both the hydrophobic and hydrophilic additives, copolymerization is very inefficient, and the product is nearly all polytetrafluoroethylene.

I claim:

1. In a process for copolymerizing in an aqueous emulsion at least two but no more than three comonomers having different solubilities in water, the monomer combinations being selected from the following classes:

(1) ethylene with at least one of methyl acrylate, ethyl acrylate, vinyl acetate, methyl methacrylate, and glycidyl methacrylate; and (2) one of ethylene, propylene, propylene, and isobutylene with one of tetrafluoroethylene and chlorotrifluoroethylene and with about 0-2 mole % of a copolymerizable vinyl monomer which is free of telogenic activity, and which incorporates into the copolymer a side chain containing at least two carbon atoms, with the side chain having only single bonds between elements, except that the side chains may consist essentially of aromatic rings;

the improvement of having present in the copolymerization medium at least two but no more than three comonomer solubility-affecting additives, at least one of which increases the solubility in water of one of the comonomers, while at least another one decreases the solubility in water of another comonomer;

with the proviso that in the case of copolymerization of three comonomers, one of the comonomers may serve as the solubility-affecting additive for another comonomer, and when the solubility affecting additive is not one of the comonomers its amount is less than about 5 percent of the weight of water.

2. The process of claim 1, wherein the water solubility at the polymerization temperature of the hydrophilic additive is at least 15% by weight of its solution in water, and it is capable of dissolving the less water-soluble comonomer at the operating temperature and pressure to give a comonomer-in-additive solution containing at least about 20% by weight of that comonomer.

3. The process of claim 1 wherein the hydrophobic additive is completely miscible at the operating temperature with the more water-soluble comonomer in all proportions and is itself soluble in water at the operating temperature to the extent of about $10^{-2}$ to $10^{-6}$ weight percent.

4. The process of claim 3 wherein the molecular weight of the hydrophobic additive is about 170-500.

5. The process of claim 1 wherein the comonomer combination is ethylene and tetrafluoroethylene.

6. The process of claim 5 wherein the hydrophilic additive is t-butyl alcohol, and the hydrophobic additive is 1,1,2-trichloro-1,2,2-trifluoroethane.

7. The process of claim 1 wherein the comonomer combination is ethylene, vinyl acetate, and glycidyl methacrylate.

8. The process of claim 7 wherein the hydrophilic additive is t-butyl alcohol, and glycidyl methacrylate serves as both a comonomer and a hydrophobic additive.

9. The process of claim 1 wherein the comonomer combination is one of class (2), and a third vinyl monomer free of telogenic activity is present.

10. The process of claim 9 wherein the third monomer is represented by one of the formulas $$R-CF=CF_2 \text{ and } R-O-CF=CF_2$$

where R is an organic group containing 2-8 carbon atoms.

11. The process of claim 10 wherein R is a highly fluorinated group.

12. The process of claim 11 wherein R is selected from the class consisting of perfluorobutene-1, perfluoroheptene-1, ω-hydroperfluorooctene-1, perfluoro(ethyl vinyl ether), 3-hydroperfluoro(propyl vinyl ether), and perfluoro(2-methylene-4-methyl-1,3-dioxolane).

* * * * *